(12) United States Patent
Engewald et al.

(10) Patent No.: US 10,910,929 B2
(45) Date of Patent: Feb. 2, 2021

(54) SYSTEM AND METHOD FOR PRODUCING A WINDING BAR FOR A STATOR WINDING

(71) Applicant: Siemens Aktiengesellschaft, Munich (DE)

(72) Inventors: Matthias Engewald, Hartmannsdorf (DE); Michael Schuetz, Erfurt (DE); Henry Werner, Ilmenau/Heyda (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 267 days.

(21) Appl. No.: 15/753,234

(22) PCT Filed: Aug. 23, 2016

(86) PCT No.: PCT/EP2016/069863
§ 371 (c)(1),
(2) Date: Feb. 16, 2018

(87) PCT Pub. No.: WO2017/045873
PCT Pub. Date: Mar. 23, 2017

(65) Prior Publication Data
US 2018/0294699 A1   Oct. 11, 2018

(30) Foreign Application Priority Data
Sep. 14, 2015   (EP) .................... 15185065

(51) Int. Cl.
*H02K 15/04*   (2006.01)
*H02K 1/16*   (2006.01)
(Continued)

(52) U.S. Cl.
CPC ........... *H02K 15/0421* (2013.01); *H02K 1/16* (2013.01); *H02K 3/12* (2013.01); *H02K 7/1823* (2013.01); *H02K 15/0414* (2013.01)

(58) Field of Classification Search
CPC ......... B21C 19/00; B21C 37/00; B21C 37/04; B21C 37/045; H02K 1/16; H02K 3/12;
(Continued)

(56) References Cited

U.S. PATENT DOCUMENTS 1,566,227 A * 12/1925 Pleasant ................. B21D 11/10
72/31.01
2,393,397 A    1/1946 Mullarkey
(Continued)

FOREIGN PATENT DOCUMENTS

EP         135483 A1 *  3/1985
EP       1914867 A2     4/2008
(Continued)

OTHER PUBLICATIONS

IPEA (PCT/IPEA 416 and 409) dated Jul. 26, 2017, for PCT/EP2016/069863.
(Continued)

*Primary Examiner* — Carl J Arbes

(57) ABSTRACT

A system for producing a winding bar for a stator winding of a stator of a rotating electric machine, in particular a turbine generator, having two machining units which can be arranged at a variable distance to each other. Each machining unit has machining device for machining an end portion of the winding bar, and each machining device is arranged on the respective machining unit in a pivotal manner about a pivot axis via at least one respective pivot arm. The pivot axis is identical to a longitudinal central axis of the rotating electric machine, and the radial distance between each machining device can be varied relative to the pivot axis.

13 Claims, 4 Drawing Sheets

(51) Int. Cl.
*H02K 3/12* (2006.01)
*H02K 7/18* (2006.01)

(58) Field of Classification Search
CPC ............. H02K 7/1823; H02K 15/0414; H02K 15/0421
See application file for complete search history.

(56) References Cited

U.S. PATENT DOCUMENTS

| | | | | |
|---|---|---|---|---|
| 2,841,200 | A | * | 7/1958 | James .................. H02K 15/045 72/298 |
| 2,962,076 | A | * | 11/1960 | Durham ............... H02K 15/045 72/295 |
| 4,138,874 | A | | 2/1979 | Kolesar et al. |
| 4,969,606 | A | * | 11/1990 | Santandrea .......... H02K 15/095 242/432.6 |
| 6,272,893 | B1 | * | 8/2001 | Kleinburger ....... H02K 15/0414 72/16.2 |
| 7,530,161 | B2 | * | 5/2009 | Clough .............. H02K 15/0414 242/433.2 |
| 9,917,494 | B2 | * | 3/2018 | Yamada ................. H02K 15/04 |
| 2006/0108728 | A1 | | 5/2006 | Schumacher et al. |

FOREIGN PATENT DOCUMENTS

FR 2998495 A1 5/2014
WO 2002078155 A1 * 10/2002

OTHER PUBLICATIONS

International Search Report dated Oct. 31, 2016, for PCT/EP2016/069863.
EP Search Report dated Jan. 21, 2016, for EP patent application No. 15185065.8.

\* cited by examiner

SYSTEM AND METHOD FOR PRODUCING A WINDING BAR FOR A STATOR WINDING

CROSS REFERENCE TO RELATED APPLICATIONS

This application is the US National Stage of International Application No. PCT/EP2016/069863 filed Aug. 23, 2016, and claims the benefit thereof. The International Application claims the benefit of European Application No. EP15185065 filed Sep. 14, 2015. All of the applications are incorporated by reference herein in their entirety.

FIELD OF INVENTION

The invention relates to a system and a method for producing a winding bar for a stator winding of a stator of a rotating electric machine, in particular of a turbogenerator.

BACKGROUND OF INVENTION

Rotating electric machines are used in power plants in the form of turbogenerators for generating electrical energy. Here, a turbogenerator is customarily driven by a gas turbine or steam turbine.

A turbogenerator comprises a stator and a rotor. The stator can be provided with stator windings which can be supplied with electrical energy in order to generate a magnetic field. As a rule, these stator windings are formed by winding bars whose straight parts can be inserted into longitudinal grooves on a stator basic body. The end portions of the winding bars form a respective winding head on both axial ends of the turbogenerator. In the region of such a winding head, the winding bars have a relatively complex shaping in order to form an axially outwardly widening opening cone radially on the inside of the winding head, wherein the winding bars in the region of the winding head are formed partially as involutes of the cone envelope of the opening cone.

The shaping of a winding bar is conventionally produced by bending operations. Such bending is customarily carried out by hand or machine. Machine bending generally requires a high and thus cost-intensive equipment outlay. Subsequent reference points of the machine-bent winding bars are conventionally not physically reproducible on the respective bending machine. The correct setting of a bending machine is usually achieved by iterative device steps. It is only subsequently that a plurality of winding bars can be formed with the setting of a bending machine that is found in this way.

SUMMARY OF INVENTION

It is an object of the invention to simplify the machine complexity for producing winding bars.

A system according to the invention for producing a winding bar for a stator winding of a stator of a rotating electric machine, in particular of a turbogenerator, comprises two processing units which can be arranged at a variable distance from one another, wherein each processing unit has processing means for processing an end portion of the winding bar. Each processing means is arranged on the respective processing unit so as to be pivotable about a pivot axis via at least one respective pivot arm, wherein the pivot axis is identical to a longitudinal center axis of the rotating electric machine. A radial distance between each processing means is variable relative to the pivot axis.

According to the invention, the processing means are oriented relative to the longitudinal center axis of the rotating electric machine in order to carry out a production operation. As a result, it is possible in particular for the profile of the end portions of the winding bars that form the winding heads to be reproduced on the system according to the invention. With consideration to the longitudinal center axis of the rotating electric machine, the respective winding head geometry, in particular the cone envelope of the opening cone of the respective winding head, can be actually reproduced with the system according to the invention. In addition, a position of a winding bar on the respective stator can be actually reproduced with the system according to the invention. The system according to the invention can thus be designed with the use of available drawing data and without using test pieces. The respective geometric profile of the winding bar to be produced is visually reproducible and can be detected with the use of simple means, for example templates. The arrangement of the processing means on the pivot arms which are pivotably mounted on the pivot axis is associated with a simple and cost-effective mechanically engineered implementation of the system according to the invention.

The variability of the distance between the processing units makes it possible for the system to be adapted in a simple manner to the respective length of the straight part of the winding bar which is to be respectively produced. For this purpose, the processing units can be movably arranged on a common linear guide, for example a guide rail, and can be fixed in a desired position. The variability of the radial distance between a processing means and the pivot axis makes it possible for the systems according to the invention to be adapted to different bore diameters of stators.

The two processing units of the system according to the invention can be formed identically, in particular with mirror symmetry, in order to be able to process both end portions of a winding bar in the same way.

A first processing means is advantageously designed first to radially outwardly angle off an end portion of the winding bar at a predetermined cone angle of an opening cone of a winding head of the stator with respect to the pivot axis and then to deform the resulting, angled-off portion of the winding bar about a bending axis extending transversely to the pivot axis in order to form a winding head portion of the winding bar. For this purpose, the radial distance between the first process means and the pivot axis is set. Here, the first processing means can additionally have an adjusting device by means of which the system can be adapted to different bar widths. This is required since the pivot axis is identical to a longitudinal center axis of the straight part of the winding bar, which, in the case of different bar widths, has an influence on the radial distance to be assumed between the first processing means and the longitudinal center axis or pivot axis. The first processing means can be designed to deform the angled-off portion of the winding bar about a bending axis which extends at an angle, for example perpendicularly, to the pivot axis in order to form the winding head portion of the winding bar. The first processing means can thus be set with consideration to the respective cone angle of the opening cone of the winding head of the stator, the respective bending angle and the respective bar width.

At least one processing unit advantageously has at least one lifting crane by means of which an end portion of the angled-off portion of the winding bar can be lifted during the deformation of the angled-off portion of the winding bar. The lifting crane makes it possible to avoid contact between the angled-off portion of the winding bar and further components of the system during the deformation or bending of the angled-off portion. In addition, the angled-off portion of the winding bar can be deposited by the lifting crane in further processing means for further processing.

At least one processing unit advantageously has a plurality of processing means in the form of grippers in which there can be deposited and clamped the angled-off portion of the winding bar with a profile which is curved about the pivot axis, wherein each gripper is functionally connected to a respective actuator by means of which the respective gripper can be moved back and forth on the respective pivot arm radially and/or parallel to the pivot axis, in particular parallel to the cone angle. The angled-off portion of the winding bar can be deposited in the grippers by means of the lifting crane. The grippers can additionally also be tilted. After depositing the angled-off portion of the winding bar, the grippers can be closed. The grippers can be oriented such that the angled-off portion of the winding bar assumes its involute profile. For this purpose, the grippers can be arranged in a uniformly distributed manner. There can additionally be present on the processing unit at least one holding-down means which additionally secures the involute profile of the angled-off portion of the winding bar, in particular during a following processing step with a further processing means.

A second processing means is advantageously designed to deform a free end portion of the angled-off portion of the winding bar about a bending axis which extends transversely to the pivot axis. The second processing means can additionally be arranged so as to be displaceable parallel to the pivot axis. The second processing means can additionally have an adjusting device by means of which the system can be adapted to different bar widths. This is required since the pivot axis is identical to a longitudinal center axis of the straight part of the winding bar, which, in the case of different bar widths, has an influence on the radial distance to be assumed between the second processing means and the longitudinal center axis or pivot axis. The second processing means can thus be set with consideration to the respective shaping of the winding head, the respective cone angle of the opening cone of the winding head of the stator, the respective bending angle and the respective bar width.

At least one processing unit advantageously has at least one processing means in the form of a separating unit by means of which an end portion of the free end portion of the angled-off portion of the winding bar can be severed from the angled-off portion. The separating unit can be mechanically coupled to the second processing means or arranged separately therefrom. The separating unit can have a cutting device and a hydraulic or electromechanical actuator which drives the latter.

The system advantageously comprises at least one system electronics which is designed to arrange the processing units with respect to one another and to arrange the individual processing means relative to the pivot axis and also to control the processing means in dependence on predetermined structural parameters of the rotating electric machine. In particular, here, the system electronics can take into consideration the position of the longitudinal center axis of the rotating electric machine and also the position and shaping of the opening cone of the stator. The system electronics can be connected by means of signals to the processing means.

A method according to the invention for producing a winding bar for a stator winding of a stator of a rotating electric machine, in particular of a turbogenerator, comprises the following stepsz:—providing a winding bar blank;—determining structural parameters of the rotating electric machine with a respect to a longitudinal center axis of the rotating electric machine;—arranging processing means with consideration to the determined structural parameters of the rotating electric machine; and—carrying out temporally sequential processing steps on the winding bar blank by means of the processing means.

The advantages stated above with respect to the system are correspondingly associated with the method. In particular, the system according to one of the aforementioned embodiments or any desired combination thereof can be designed to carry out the method.

At least one position of an opening cone of a winding head of the stator relative to the longitudinal center axis and a cone angle of the opening cone of the winding head are preferably determined as the structural parameters of the rotating electric machine. This is associated with the advantages stated above with reference to the corresponding embodiments of the system.

BRIEF DESCRIPTION OF THE DRAWINGS

An embodiment of a system according to the invention is explained below with reference to the appended schematic drawings, in which.

DETAILED DESCRIPTION OF INVENTION

Figure 1:
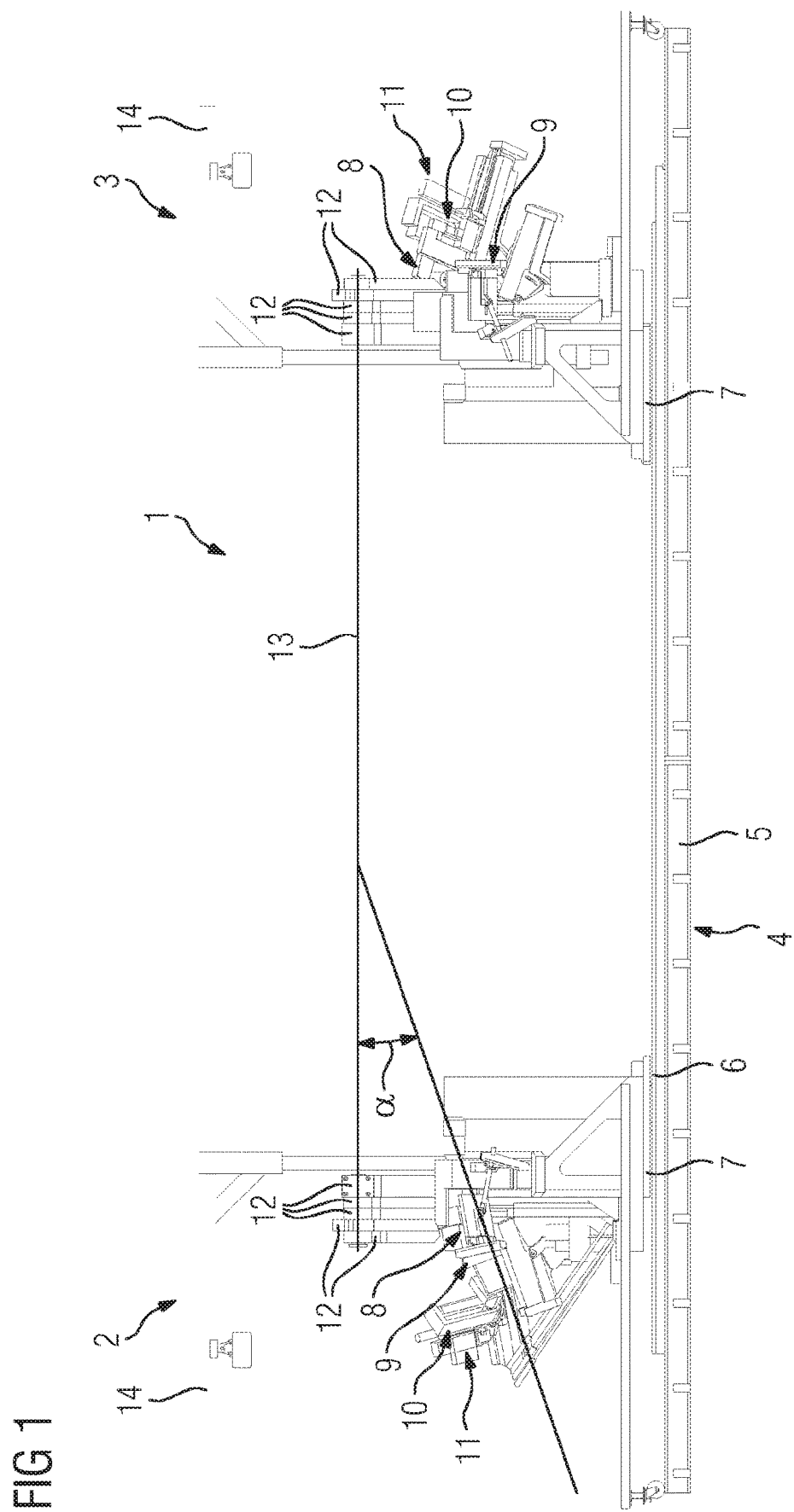
FIG. 1 shows a schematic illustration of an exemplary embodiment of a system according to the invention.
Figure 2:
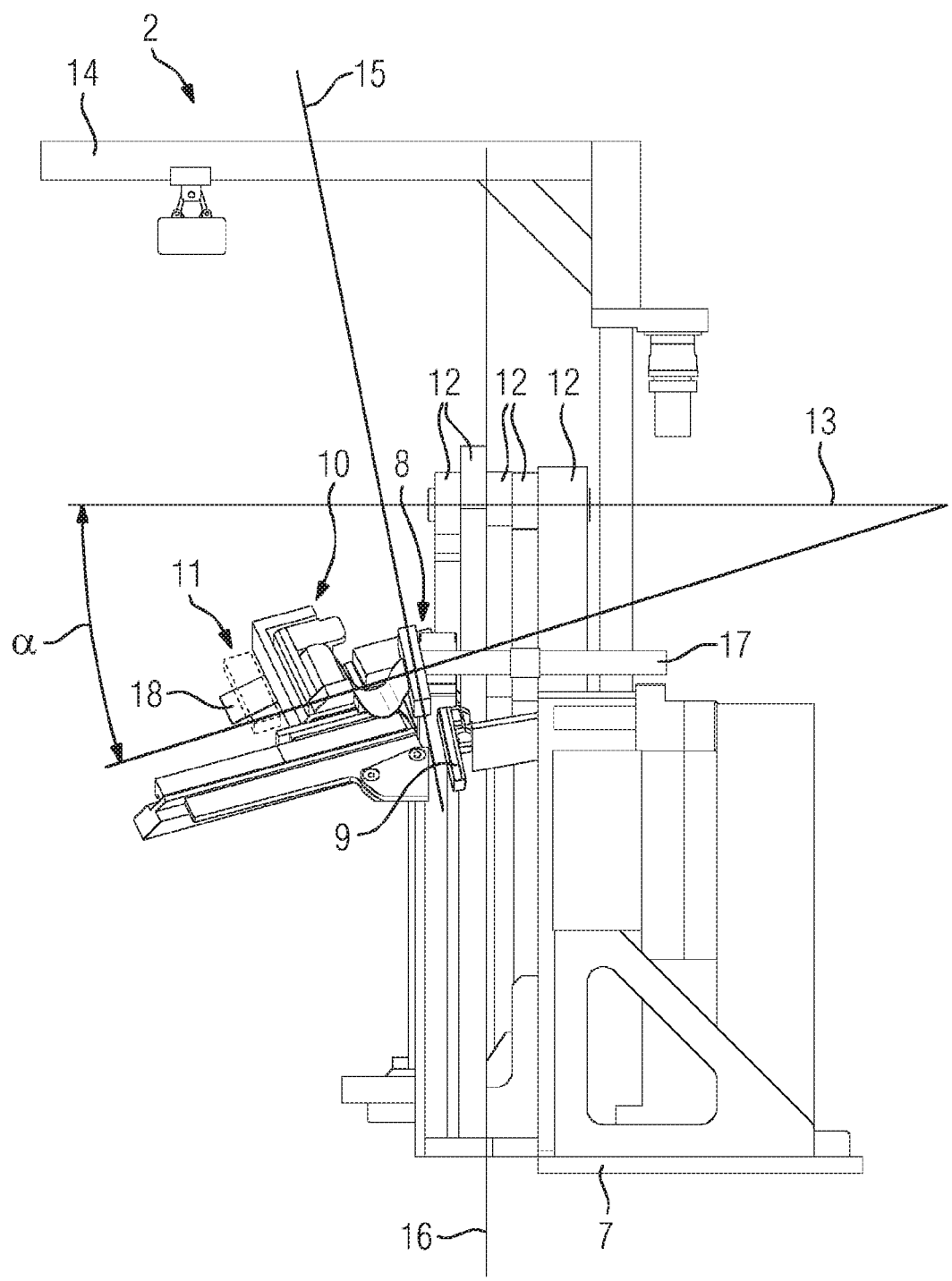
FIG. 2 shows a schematic illustration of a processing unit of the system shown in FIG. 1.
Figure 3:
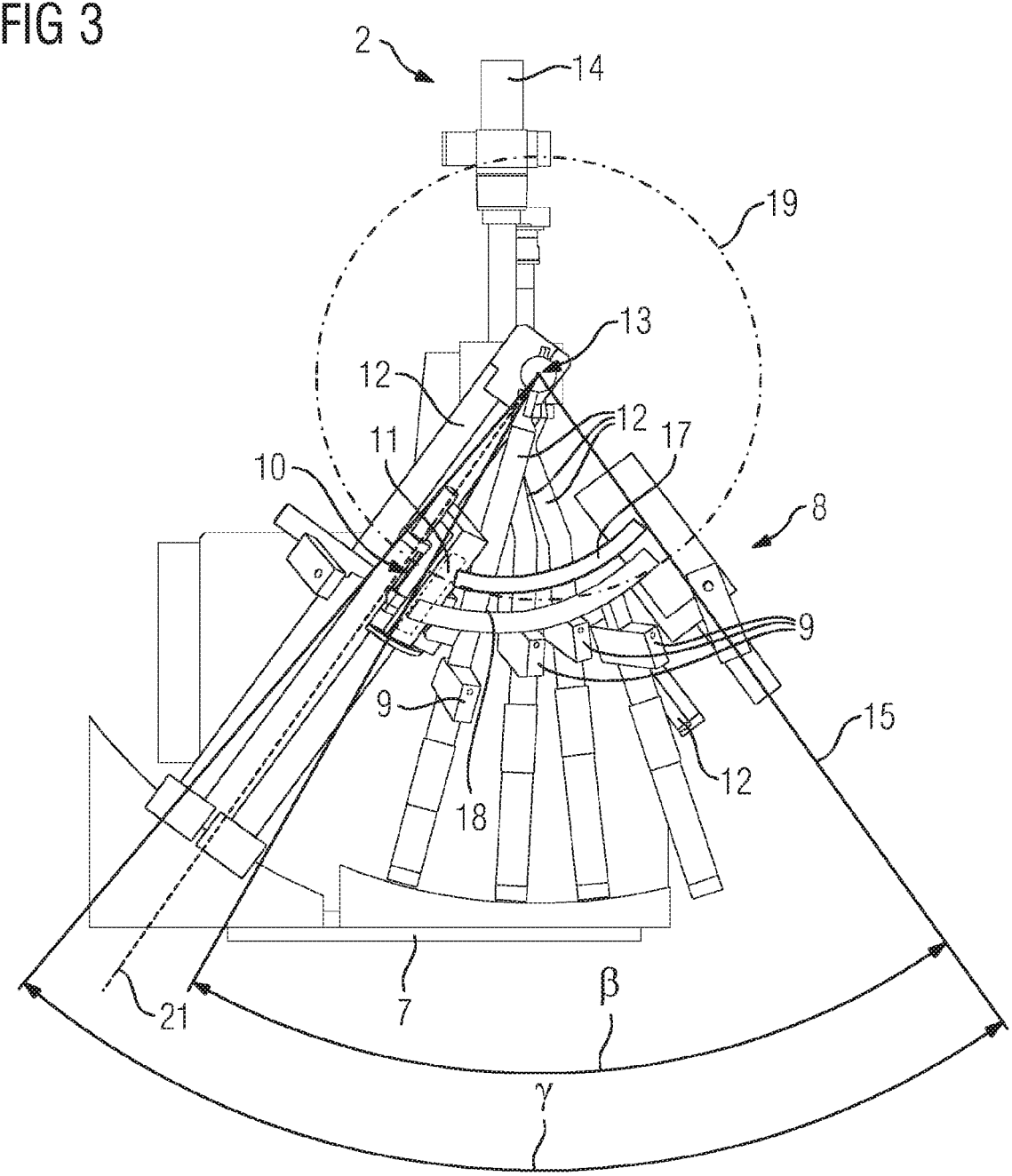
FIG. 3 shows a further schematic illustration of the processing unit shown in FIG. 2.
Figure 4:
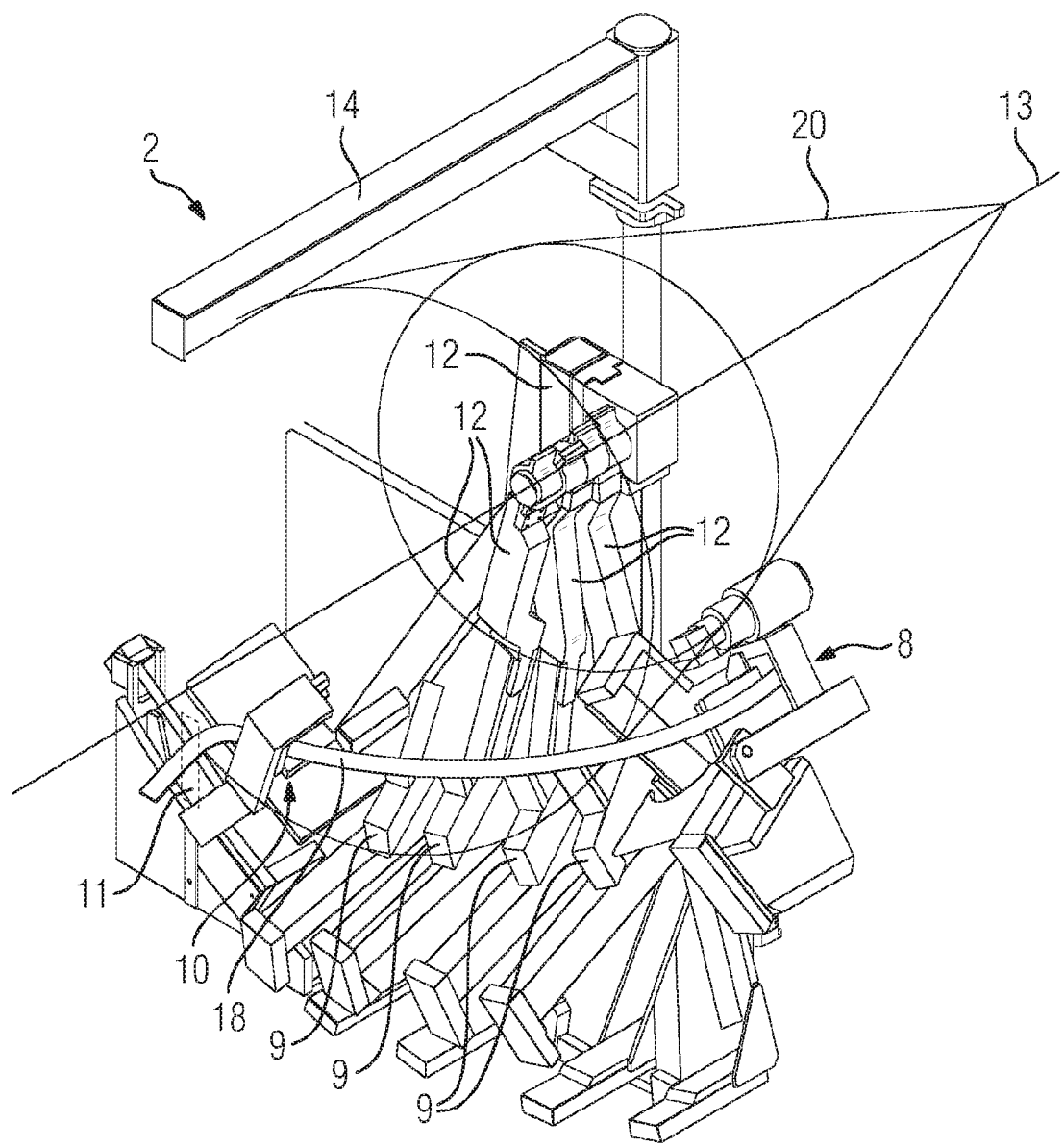
FIG. 4 shows a schematic and perspective illustration of the processing unit shown in FIGS. 2 and 3.

FIG. 1 shows a schematic illustration of an exemplary embodiment of a system 1 according to the invention for producing a winding bar, which is shown in FIGS. 2 to 4, for a stator winding of a stator of a turbogenerator.

The system 1 comprises two processing units 2 and 3 which can be arranged at a variable distance from one another. For this purpose, the processing units 2 and 3 are movably arranged on a linear guide 4. The linear guide 4 has two guide rails 6, of which only one can be seen in FIG. 1, which extend parallel to one another and are fastened on a base structure 5. Each processing unit 2 or 3 comprises a carriage 7 via which the respective processing unit 2 or 3 is displaceably arranged on the linear guide 4. In addition, at least one fixing means (not shown) is present on each carriage 7 and/or on the linear guide 4 and makes it possible to fix the respective processing unit 2 or 3 in its respectively assumed relative position with respect to the linear guide 4.

Each processing unit 2 or 3 has processing means 8 to 11 for processing an end portion of the winding bar. Each processing means 8, 9, 10 or 11 is arranged on the respective processing unit 2 or 3 so as to be pivotable about a pivot axis 13 via a respective pivot arm 12. The pivot axis 13 is identical to a longitudinal center axis of the rotating electric machine. A radial distance between each processing means 8, 9, 10 or 11 is variable relative to the pivot axis 13.

A first processing means 8 is designed first to radially outwardly angle off an end portion of the winding bar at a predetermined cone angle α of an opening cone of a winding head of the stator with respect to the pivot axis 13 and then to deform the resulting, angled-off portion of the winding bar about a bending axis which extends transversely to the pivot axis 13 in order to form a winding head portion of the winding bar.

Each processing unit 2 or 3 comprises a lifting crane 14 by means of which an end portion of the angled-off portion of the winding bar can be lifted during the deformation of the angled-off portion of the winding bar.

Each processing unit 2 or 3 comprises a plurality of processing means 9 in the form of grippers in which there can be deposited and clamped the angled-off portion of the winding bar with a profile which is curved about the pivot axis 13. Each gripper is functionally connected to a respective actuator (not shown) by means of which the respective gripper can be moved back and forth on the respective pivot arm 12 radially and/or parallel to the pivot axis 13, in particular parallel to the cone angle $\alpha$.

A second processing means 10 is designed to deform a free end portion of the angled-off portion of the winding bar about a bending axis which extends transversely to the pivot axis 13.

Each processing unit 2 or 3 additionally comprises a processing means 11 in the form of a separating unit by means of which an end portion of the free end portion of the angled-off portion of the winding bar can be severed from the angled-off portion.

Furthermore, the system 1 comprises a system electronics (not shown) which is designed to arrange the processing units 2 and 3 with respect to one another and to arrange the individual processing means 8 to 11 relative to the pivot axis 13 and also to control the processing means 8 to 11 in dependence on predetermined structural parameters of the rotating electric machine.

FIG. 2 shows a schematic illustration of the processing unit 2 of the system 1 shown in FIG. 1. The bending axis 15 which extends transversely to the pivot axis 13 is depicted in FIG. 2, about which bending axis the angled-off portion of the winding bar can be deformed in order to form the winding head portion of the winding bar by means of the processing means 8. Additionally depicted is a reference plane 16 in which the straight part of the winding bar ends. Two windings bars 17 and 18 with different bar geometries are depicted by way of example in FIG. 2 and can be selectively produced by the system 1. Moreover, reference is made to the above description for FIG. 1 in order to avoid repetitions.

FIG. 3 shows a further schematic illustration of the processing unit 2 shown in FIG. 2. An involute circle 19 is depicted which is taken into consideration during the production of the winding bar 18. In addition, an opening angle $\beta$ for the winding bar 18 and an opening angle $\gamma$ for the winding bar 17 are depicted. Moreover, reference is made to the above description for FIG. 1 in order to avoid repetitions.

FIG. 4 shows a schematic and perspective illustration of the processing unit 2 shown in FIGS. 2 and 3. FIG. 4 depicts an opening cone 20 of a winding head of the stator of the rotating electric machine, the position and shaping of which is taken into consideration in the setting of the system or of the processing unit 2. Moreover, reference is made to the above description for FIG. 1 in order to avoid repetitions.

A production operation which can be carried out by way of example with the system 1 shown in FIGS. 1 to 4 is described below.

At the start of the production operation, a winding bar blank of straight design can be arranged on the system 1. Here, the actuating means 8, 9 and 10 are opened such that they can each receive a portion of the winding bar. After the winding bar blank has been arranged on the system 1 in such a way, the winding bar blank is oriented axially, which can take place with the aid of markers which are arranged on the winding bar blank and which each mark an end of a straight part of the winding bar to be produced. The straight part can then be fixed in the vicinity of the respective processing means 8 by means of a fixing unit (not shown) of the system 1. The actuating means 8 is closed in order subsequently to be able to bring about the deformation of the winding bar blank. Sliding elements (not shown) may be inserted into the actuating means 8 in advance in order to subsequently facilitate the deformation operation. An end portion of the winding bar blank is fastened to the lifting crane 14 via a crane clamp. The winding bar blank is then angled off by means of the first processing means 8 at the cone angle $\alpha$ of the opening cone of the winding head of the stator. The resulting, angled-off portion of the winding bar is then deformed or bent about a bending axis which extends transversely to the pivot axis 13 in order to form a winding head portion of the winding bar by means of the first processing means 8. At the same time, the end portion of the winding bar blank is drawn upward by the lifting crane 14 and the lifting crane 14 is pivoted in order to guide the angled-off portion of the winding bar blank via the actuating means 9 and 10. After the winding bar blank has been deformed by means of the first actuating means 8, the angled-off portion of the winding bar blank is deposited by means of the lifting crane 14 in the actuating means 9 in the form of grippers. The grippers are then closed, which can take place manually or automatically. After the grippers have been closed, the crane clamp is removed from the end portion of the angled-off portion. Displacing the grippers radially and parallel to the pivot axis 13, in particular parallel to the cone angle $\alpha$, results in the involute profile being formed on the angled-off portion. For this purpose, the grippers are moved back and forth to a small degree, with the result that the angled-off portion is expanded such that mechanical stresses in the angled-off portion are eliminated and the involute profile of the angled-off portion is optimally formed. A part of the angled-off portion can then be fixed by means of a holding-down means (not shown) which is arranged adjacently to the second processing means 10. As a result, the tensile forces which are subsequently produced by the deformation by means of the second processing means 10 and act on the remaining part of the angled-off portion which has the involute profile can be reduced. The second actuating means 10 can then be closed in order subsequently to be able to bring abut the deformation of the end portion of the angled-off portion. Sliding elements (not shown) may be inserted into the second actuating means 10 in advance in order to subsequently facilitate the deformation operation. The end portion of the angled-off portion is then deformed by means of the second actuating means 10. The actuating means 11 in the form of a separating unit can then be arranged on a free end portion of the angled-off portion, for example placed thereon. A separating operation is then carried out by means of the separating unit and consequently a free end portion of the angled-off portion of the winding bar is severed from the angled-off portion by the separating unit. The severed part can be collected in a box arranged below. The separating unit can subsequently be removed again. The processing means 8, 9 and 10 can then be opened and the finished winding bar can then be removed from the system 1. For this purpose, the grippers may have been lowered beforehand.

Although the invention has been fully illustrated and described in detail by the preferred exemplary embodiment, the invention is not limited by the disclosed example and other variations can be derived therefrom by a person skilled in the art without departing from the scope of protection of the invention.

The invention claimed is:

1. A system (1) for producing a winding bar (17, 18) for a stator winding of a stator of a rotating electric machine, comprising:
two processing units (2, 3) which are arranged at a variable distance from one another,
wherein each processing unit (2, 3) comprises a plurality of processing means (8, 9, 10, 11) for processing an end portion of the winding bar (17, 18),
wherein each processing means (8, 9, 10, 11) of the plurality of processing means:
comprises a respective pivot arm (12); and is pivotable about a pivot axis (13) via the respective pivot arm (12),
wherein the pivot axis (13) coincides with an axis of rotation of the rotating electric machine when the winding bar is disposed in the rotating electric machine,
wherein a radial distance between each processing means (8, 9, 10, 11) is variable relative to the pivot axis (13),
wherein a first processing means (8) of the plurality of processing means (8, 9, 10, 11) is configured to: first bend the end portion of the winding bar (17, 18) radially outwardly at a predetermined cone angle ($\alpha$) of an opening cone (20) of a winding head of the stator with respect to the pivot axis (13) to form an angled-off portion of the winding bar; and second to bend the angled-off portion of the winding bar about a first bending axis (15) extending transversely to the pivot axis (13) in order to form a winding head portion of the winding bar comprising a profile that tapers radially outward relative to the pivot axis (13) in a direction toward a tip portion of the angled-off portion, and
wherein a second processing means (10) of the plurality of processing means (8, 9, 10, 11) is configured to bend the tip portion of the angled-off portion of the winding bar about a second bending axis (21) which extends transversely to the pivot axis (13).

2. The system as claimed in claim 1,
wherein at least one processing unit (14) of the two processing units (2, 3) comprises at least one lifting crane (14) by means of which the end portion of the angled-off portion of the winding bar is lifted when bending the angled-off portion about the first bending axis 15.

3. The system as claimed in claim 1,
wherein at least one processing unit of the two processing units (2, 3) comprises a plurality of grippers (9) in which is deposited and clamped the angled-off portion of the winding bar so that the angled-off portion comprises a profile which is curved about the pivot axis (13), and
wherein each gripper (9) of the plurality of grippers is functionally connected to a respective actuator by means of which the respective gripper is moved back and forth on the respective pivot arm (12) radially and/or parallel to the pivot axis (13).

4. The system as claimed in claim 1,
wherein in at least one processing unit of the two processing units (2, 3) the plurality of processing means (8, 9, 10, 11) comprises a separating unit (11) by means of which a part of the tip portion is severed off.

5. The system as claimed in claim 1, further comprising:
system electronics configured to arrange the two processing units (2, 3) with respect to one another and to arrange individual processing means (8, 9, 10, 11) of the plurality of processing means (8, 9, 10, 11) relative to the pivot axis (13) and also to control the individual processing means (8, 9, 10, 11) in dependence on predetermined structural parameters of the rotating electric machine.

6. The system as claimed in claim 1,
wherein the rotating electric machine is a turbogenerator.

7. The system as claimed in claim 3,
wherein each gripper (9) is functionally connected to the respective actuator by means of which the respective gripper (9) is moved back and forth on the respective pivot arm (12) radially and/or parallel to a cone angle ($\alpha$) of the opening cone (20).

8. The system as claimed in claim 1,
wherein the plurality of processing means (8, 9, 10, 11) comprise:
an angle deformer (8) adapted to bend the end portion to produce the angled-off portion of the winding bar,
grippers (9) adapted to clamp the angled-off portion of the winding bar,
a deformer (10) adapted to bend the tip portion of the angled-off portion of the winding bar about the second bending axis (21), and
a separating unit (11) adapted to sever a part of the tip portion off.

9. A method for producing the winding bar for a stator winding of a stator of the rotating electric machine, comprising:
providing a winding bar blank;
determining parameters of the rotating electric machine with respect to the pivot axis of the rotating electric machine;
arranging the processing means (8, 9, 10, 11) of the system of claim 1 with consideration to the determined parameters of the rotating electric machine;
bending the end portion of the winding bar (17, 18) radially outwardly at the predetermined cone angle ($\alpha$) of the opening cone (20) of the winding head of the stator with respect to the pivot axis (13) to form the angled-off portion of the winding bar by means of the system of claim 1;
bending the angled-off portion of the winding bar about the first bending axis (15) extending transversely to the pivot axis (13) in order to form a winding head portion of the winding bar by means of the system of claim 1, and
bending the tip portion of the angled-off portion of the winding bar about the second bending axis (21) which extends transversely to the pivot axis (13) by means of the system of claim 1.

10. The method as claimed in claim 9,
wherein at least one position of the opening cone (20) of the winding head of the stator relative to the pivot axis and a cone angle ($\alpha$) of the opening cone (20) of the winding head are determined as parameters of the rotating electric machine.

11. The method as claimed in claim 9,
wherein the plurality of processing means (8, 9, 10, 11) comprise:
an angle deformer (8) adapted to produce the angled-off portion of the winding bar,
grippers (9) adapted to clamp the angled-off portion of the winding bar, a deformer (10) adapted to bend the tip portion of the angled-off portion of the winding bar about the second bending axis (21), and a separating unit (11) adapted to sever a part of the tip portion off.

12. The method as claimed in claim 11, further comprising:

producing the angled-off portion of the winding bar with the angle deformer (8), clamping the angled-off portion of the winding bar with the grippers (9), bending the tip portion of the angled-off portion of the winding bar about the second bending axis (21) with the deformer (10), and severing the part of the tip portion off with the separating unit (11).

13. The method as claimed in claim 9, wherein the rotating electric machine is a turbogenerator.

\* \* \* \* \*